(12) United States Patent
Mathieu

(10) Patent No.: US 11,775,088 B2
(45) Date of Patent: Oct. 3, 2023

(54) INTERFACE FOR CONTROLLING AT LEAST ONE FUNCTION OF A UNIT OF A MOTOR VEHICLE

(71) Applicant: VALEO COMFORT AND DRIVING ASSISTANCE, Créteil (FR)

(72) Inventor: Jerome Mathieu, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 2 days.

(21) Appl. No.: 17/618,704

(22) PCT Filed: Apr. 22, 2020

(86) PCT No.: PCT/EP2020/061231
§ 371 (c)(1),
(2) Date: Dec. 13, 2021

(87) PCT Pub. No.: WO2020/249293
PCT Pub. Date: Dec. 17, 2020

(65) Prior Publication Data
US 2022/0244795 A1    Aug. 4, 2022

(30) Foreign Application Priority Data

Jun. 14, 2019  (FR) .................................. FR1906418

(51) Int. Cl.
*G06F 3/0362* (2013.01)
*B60K 37/06* (2006.01)
*G06F 3/044* (2006.01)

(52) U.S. Cl.
CPC ............ *G06F 3/0362* (2013.01); *B60K 37/06* (2013.01); *G06F 3/044* (2013.01); *B60K 2370/126* (2019.05); *B60K 2370/143* (2019.05)

(58) Field of Classification Search
CPC ....... G06F 3/0362; G06F 3/044; B60K 37/06; B60K 2370/126; B60K 2370/143
See application file for complete search history.

(56) References Cited

U.S. PATENT DOCUMENTS

2010/0020042 A1    1/2010  Stelandre et al.

FOREIGN PATENT DOCUMENTS

| DE | 102017114990 B3 | 10/2018 |
| FR | 3033423 A1 | 9/2016 |
| WO | 2018-114138 A1 | 6/2018 |

OTHER PUBLICATIONS

International Search Report and Written Opinion in corresponding International Publication No. PCT/EP2020/061231, dated Jun. 23, 2020 (10 pages).

*Primary Examiner* — Michael Pervan
(74) *Attorney, Agent, or Firm* — Osha Bergman Watanabe & Burton LLP

(57) ABSTRACT

An interface for controlling at least one function of a unit of a motor vehicle, comprising a display screen (7) and at least one control member (2) comprising a mobile gripping element (2a) that is rotatably mobile about an axis (A), at least two conductive indicators (10) that are borne by the mobile element (2a) and that are mobile together with same and a guide (2b), the interface being characterized in that it comprises a capacitive sensor (6) comprising a plurality of electrodes (12) that are configured to detect a variation in the angular position of the conductive indicators (10) and in that the guide (2b) is at least partly fixed to the display screen (7) such that the mobile element (2a) partially covers the screen, the electrodes (12) being arranged in a contiguous region (6a) of the screen (7), such that the indicators (10) are movable so as to face the electrodes (12) when the mobile element (2a) is moved about its axis.

15 Claims, 4 Drawing Sheets

INTERFACE FOR CONTROLLING AT LEAST ONE FUNCTION OF A UNIT OF A MOTOR VEHICLE

TECHNICAL FIELD

Figure 1:
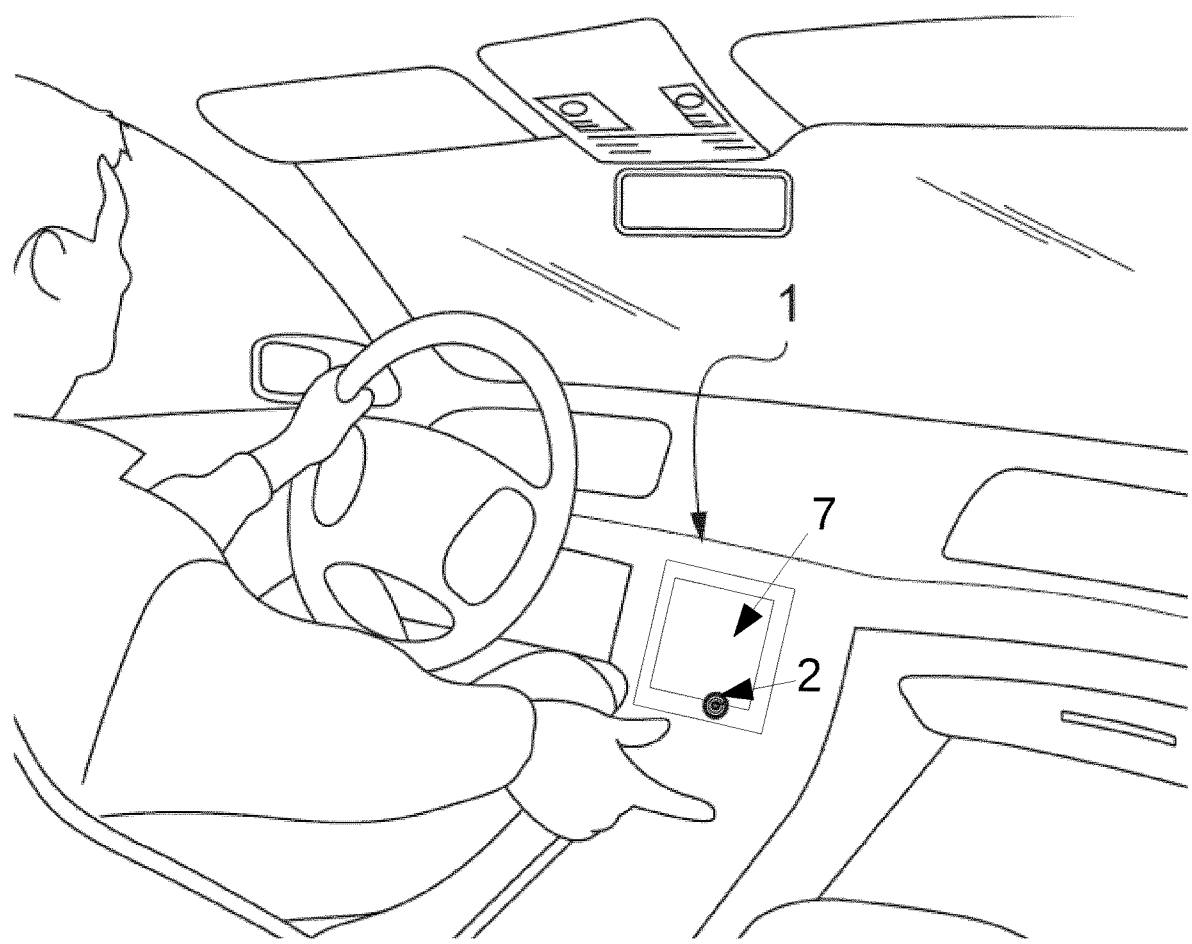

The present invention relates to the field of interfaces for controlling at least one function of a unit of a motor vehicle.

PRIOR ART

In the automotive field, electrical units, such as the air-conditioning or navigation system, are generally controlled by means of a control member such as a mechanical rotary button. The latter generally comprises a movable grip element, such as a knob, mounted on a guide. The guide supports and guides the rotation of the movable grip element, which is configured to be turned in a rotational movement and the angular positioning of which is determined, for example, by an optical sensor or by an electrical rotary switch.

It is known practice to combine a control member with a touchscreen within a control system. The control member, such as a rotary button, is generally arranged on the screen. In this type of system, a capacitive touch panel of the screen detects the change in the angular position of at least one metal indicator borne by the movable grip element of the control member. The detection of a change in the angular position of a metal indicator allows a processing unit to subsequently select a particular command on the basis of the angular position of the movable grip element and to control, for example, an audio system, a heating, ventilation and air-conditioning system or any other system.

This system makes it possible, in particular, to program the display of the touchscreen in order to provide the user with visual information concerning the various functions to be controlled. A large number of different commands may thus be associated with the same control member. The screen may, for example, be programmed to display the position of the flaps and the temperature of the air-conditioning system or else serve to display the setting of parameters of the audio system of the vehicle. The rotation of the movable grip element allows the user in particular to scroll an element in a list or to increment/decrement a variable, the selection thus made being able to be displayed on the screen. Once the element has been selected or the value of the variable has been modified, the choice may then be validated, for example by contact with the touchscreen.

However, the presence of a control member on a touchscreen entails a loss of the display area on this screen, this area being obstructed by the structure of the control member. Indeed, the detection of the change in the angular position of the movable grip element is performed by the touchscreen. This may result in a non-negligible loss of surface area of the display screen, said loss depending on the size of the control member.

One object of the present invention is to provide a simple, effective and economical solution which at least partially overcomes these drawbacks.

SUMMARY OF THE INVENTION

To this end, the subject of the invention is an interface for controlling at least one function of a unit of a motor vehicle, including at least one control member comprising a movable grip element, which is able to rotate about an axis of rotation, at least two conductive indicators, which are borne by the movable grip element and are able to move together with the latter, and a guide, the movable grip element being supported and guided in rotation by the guide, the interface comprising a display screen, the interface also comprising a capacitive sensor comprising a plurality of electrodes configured to detect a change in the angular position of the conductive indicators, the electrodes of the capacitive sensor being arranged in an area adjoining the display screen, the movable grip element being configured to partially overlap the display screen and the capacitive sensor so that the conductive indicators are movable opposite the electrodes of the capacitive sensor during a rotational movement of the movable grip element about its axis of rotation.

With part of the control member being outside the display screen, so that the movable grip element partially overlaps the display screen and the electrodes of the capacitive sensor that are arranged in an area adjoining the display screen, the surface area obstructed by the control member on the display area of the screen is reduced. This makes more space available on the screen for displaying the various functions to be controlled.

Moreover, this solution makes it possible to use a standard display screen, which may or may not be touch-sensitive and does not require any particular computing resources to determine the angular position of the movable grip element.

This configuration makes it possible to combine a display screen with a control member at a lower cost, in particular if the interface already has a circuit board including one or more circuits for capacitive measurements, as in the case of a touchpad integrated in the dashboard of the vehicle.

The invention may further comprise one or more of the following aspects taken alone or in combination:
- the display screen comprises a capacitive panel including a disabled area configured to ignore the change in the angular position of the conductive indicators during a rotational movement of the movable grip element about its axis of rotation;
- an area of overlap of the movable grip element on the display screen is between 20% and 50% of the projected surface area of the movable grip element on the interface;
- the movable grip element bears between two and ten conductive indicators;
- the size of the overlap area is such that at least a portion of a conductive indicator is present in the overlap area, independently of the angular position of the movable grip element;
- the overlap area is in the shape of a circular segment, and an angle indicating the angle between two radii delimiting a circular arc of the circular segment is at least equal to an angular spacing between two adjacent conductive indicators;
- a first half of the movable grip element overlaps the display screen, and the second half of the movable grip element overlaps the electrodes of the capacitive sensor that are arranged in the area adjoining the display screen;
- the movable grip element bears two conductive indicators located at two diametrically opposite points of the movable grip element;
- the conductive indicators are arranged in a circle and are regularly spaced apart around the axis of rotation of the movable grip element;
- the electrodes of the capacitive sensor are borne by a flexible circuit board;
- the electrodes of the capacitive sensor are in the shape of a circular sector;

the electrodes of the capacitive sensor are produced in the form of metal wires forming antennas;

the electrodes of the capacitive sensor are produced in the form of metallized pads;

the electrodes of the capacitive sensor are arranged in a circular arc in the area adjoining the display screen;

the electrodes of the capacitive sensor are arranged in a line next to one another in the area adjoining the display screen;

the width of the electrodes located at the ends of the line is less than the width of the electrodes located in the middle of the line;

the guide of the control member is adhesively bonded to a front plate of the interface.

Figure 2:
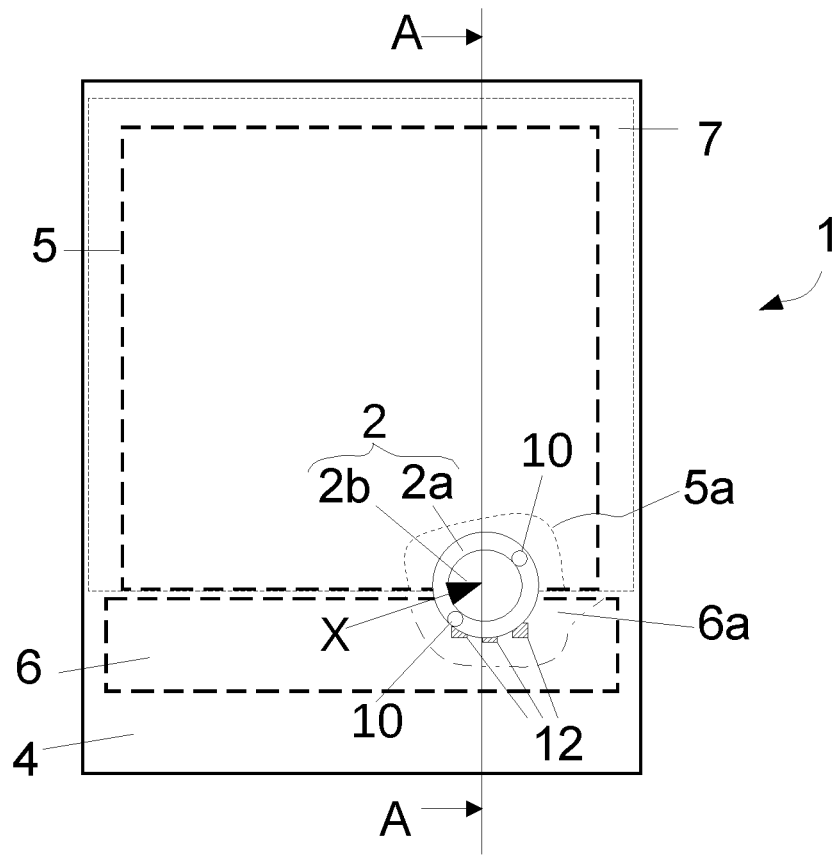
Figure 3:
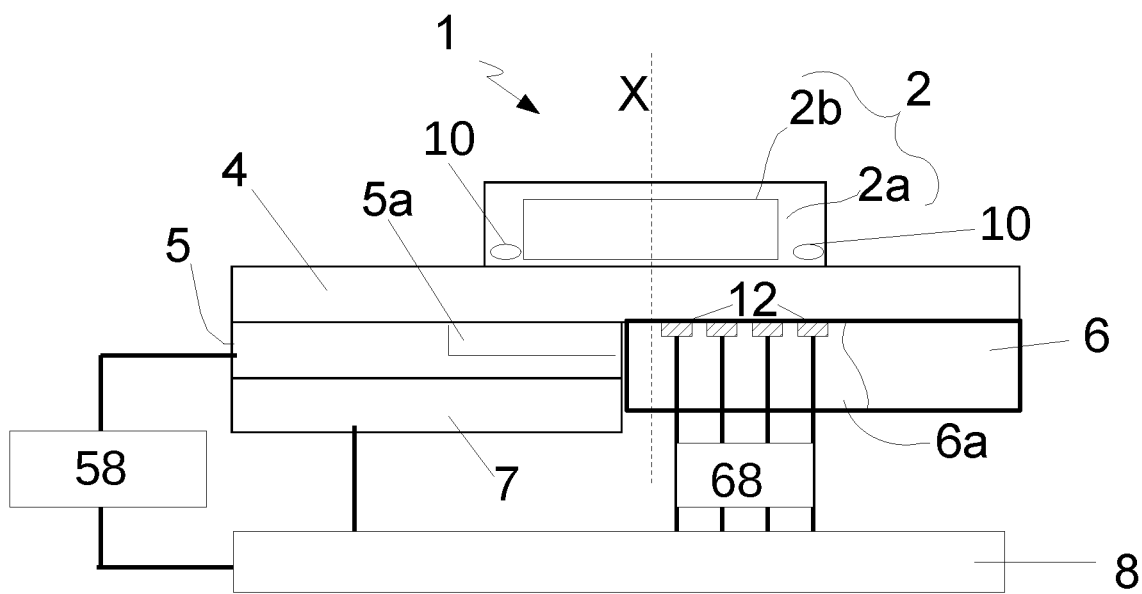
Figure 4:
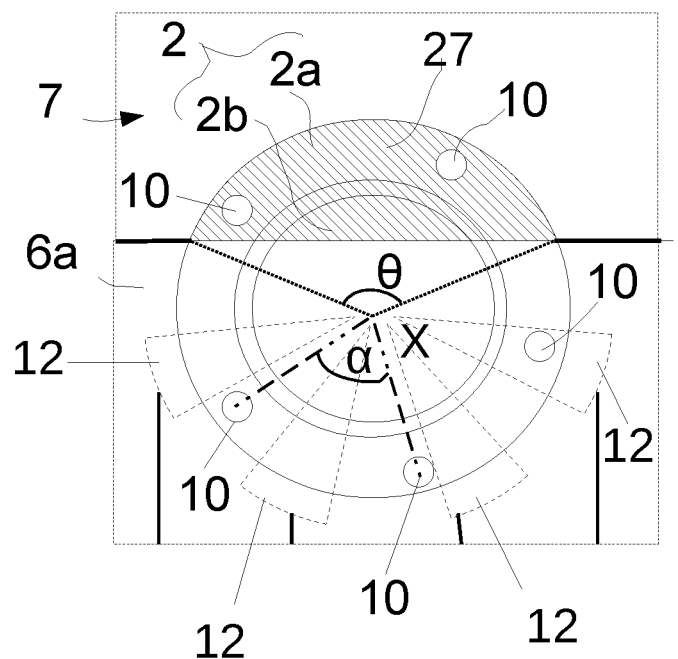
Figures 5A, 5B, 5C:
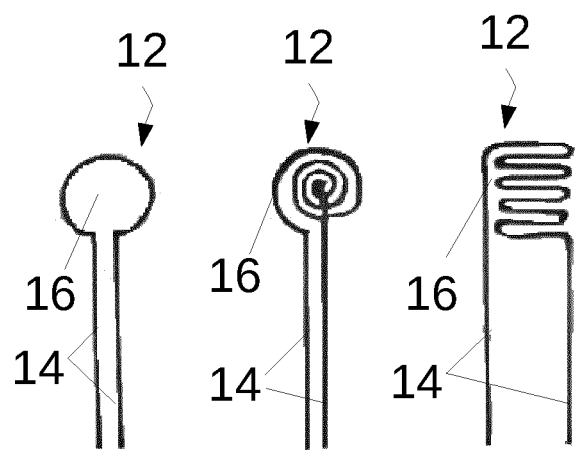
Figure 6:
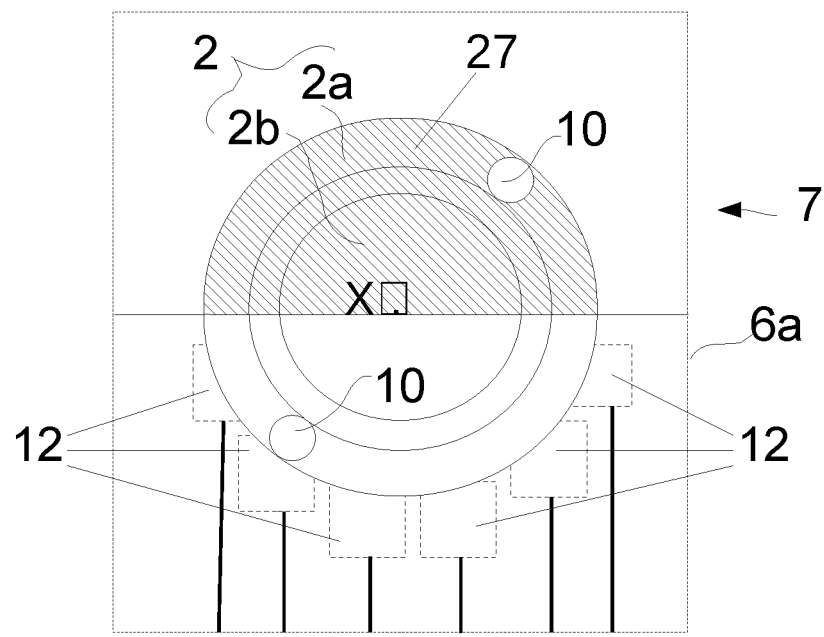
Figure 7:
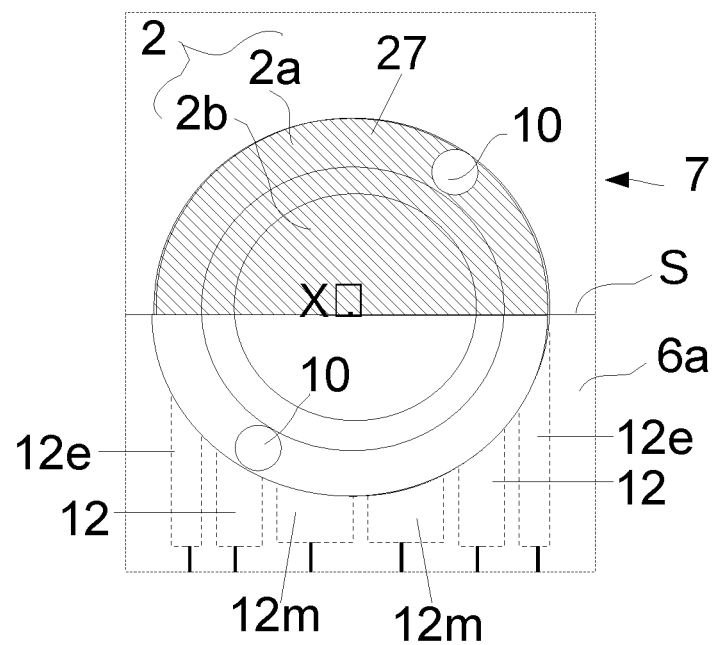

Other features and advantages of the invention will emerge from the following description, given by way of non-limiting example, with reference to the appended drawings, in which:

FIG. 1 shows a view of a portion of the passenger compartment inside a motor vehicle comprising an interface which is installed by way of example at the front of the vehicle, FIG. 2 shows a schematic view of a configuration of the interface of FIG. 1, FIG. 3 shows a schematic view of the interface of FIG. 2 along section line A-A, FIG. 4 shows a schematic detail view of a first embodiment of the interface of FIG. 2, FIG. 5a shows a first embodiment of an electrode of the interface of FIG. 2, FIG. 5b shows a second embodiment of an electrode of the interface of FIG. 2, FIG. 5c shows a third embodiment of an electrode of the interface of FIG. 2, FIG. 6 shows a view similar to FIG. 4 for a first variant of the arrangement of the electrodes, FIG. 7 shows a view similar to FIG. 4 for a second variant of the arrangement of the electrodes.

DETAILED DESCRIPTION

In all the figures, elements having identical functions bear the same reference numbers.

The following embodiments are examples. Although the description refers to one or more embodiments, this does not necessarily mean that each reference sign relates to the same embodiment, or that the features apply only to a single embodiment. Individual features of different embodiments may also be combined or interchanged in order to create other embodiments.

FIG. 1 illustrates a passenger compartment including an interface 1 for controlling at least one function of a unit of a motor vehicle, the interface 1 including at least one control member 2 and a display screen 7. The interface 1 allows at least one function of a unit of a motor vehicle to be controlled, for example allows the air-conditioning functions, the functions of an audio system, of a telephony system or else of a navigation system to be controlled. This interface 1 may also be used for controlling window regulators or the position of the exterior mirrors or else for moving motorized seats or for controlling interior lights, a central locking system, a sunroof, hazard lights or mood lights.

The interface 1 allows the user, for example, to scroll through a list, to make a selection or to validate a selection. For example, it allows the user to select a destination postal address or a name from a directory, or the air-conditioning system settings, or to select a music track from a list. The interface 1 may include a plurality of control members 2, for example two control members, one for the driver and the other for the passenger.

FIG. 2 schematically illustrates an embodiment of the interface 1 given solely by way of example. The control member 2 comprises a movable grip element 2a, which is able to rotate about an axis of rotation X perpendicular to the display screen 7, and also a guide 2b, the movable grip element 2a being supported and guided in rotation by the guide 2b.

The movable grip element 2a is, for example, a knob. The movable grip element 2a and the guide 2b are of generally cylindrical or annular shapes and are arranged coaxially with one another. A user is able to manipulate the movable grip element 2a to rotate it clockwise and counterclockwise about the axis of rotation X.

The control member 2 also includes at least two conductive indicators 10 borne by the movable grip element 2a. The movable grip element 2a bears, for example, between two and ten conductive indicators 10. During a rotational movement of the movable grip element 2a about its axis of rotation X caused by a user manipulating the control member 2, the conductive indicators 10, which are able to move together with the movable grip element 2a, are driven in rotation about the axis of rotation X and are thus caused to move along a circular or arcuate path.

The material of the conductive indicators 10 is, for example, a conductive plastic material or else a metallic material such as iron, copper or aluminum. Each conductive indicator 10 is, for example, a metal tab or patch that is electrically connected to an external conductive surface of the movable grip element 2a that is intended to be manipulated by the user. According to an example that is not illustrated, the movable grip element 2a includes, for example, a coating arranged at the external grip surface, such as a chrome-plated covering that is electrically connected to each conductive indicator 10.

The interface 1 includes, for example, a front plate 4 to which the guide 2b of the control member 2 may be adhesively bonded, for example by means of an adhesive or double-sided adhesive tapes. The front plate 4 is, for example, arranged facing the user once installed in the passenger compartment. It may be a glass or plastic plate. The front plate 4 may be flat or curved.

The display screen 7, such as a thin-film transistor screen or an LED screen or an LCD screen, is in particular configured to display visual information associated with the manipulation of the interface 1.

The interface 1 also comprises a capacitive sensor 6 comprising a plurality of electrodes 12 configured to detect a change in the angular position of the conductive indicators 10. The electrodes 12 of the capacitive sensor 6 are electrically isolated from one another and are arranged in an area 6a adjoining the display screen 7. "An area 6a adjoining the display screen 7" is intended to mean an area located in the immediate vicinity of the edges of the display screen 7.

The movable grip element 2a is configured to partially overlap the display screen 7 and the capacitive sensor 6, as illustrated in FIG. 2. It is arranged so that the conductive indicators 10 are movable opposite the electrodes 12 of the capacitive sensor 6 during a rotational movement of the movable grip element 2a about its axis of rotation X.

The electrodes 12 of the capacitive sensor 6 are, for example, metal tracks etched into a non-conductive substrate of the capacitive sensor 6 or else metal tracks or patches deposited on a non-conductive substrate of the capacitive sensor 6.

The electrodes 12 of the capacitive sensor 6 are, for example, borne by a flexible circuit board (known as "PCB Flex"). This type of flexible circuit board has the advantage of being, for example, foldable and is thus able to be used in spaces with small volumes, with the aim of limiting the space taken up by the interface in the dashboard of the vehicle.

Each electrode 12 is, for example, individually connected to a processing unit 8 shown schematically in FIG. 3 and connected to a capacitive controller 68. The capacitive controller 68 may be specifically dedicated to capacitive measurements, in which case it is responsible for measuring variations in capacitance that are detected by the electrodes 12 and for transmitting the data to the processing unit 8.

The processing unit 8 is, for example, configured to control an audio system, a heating, ventilation and air-conditioning system or any other system as described above. The processing unit 8 includes, for example, one or more microcontrollers or computers having memories and programs designed to modify the display of the display screen 7. The processing unit 8 is, for example, the on-board computer of the motor vehicle. The flexible circuit board mentioned above may, for example, serve as a support for the processing unit 8.

In a first embodiment, the display screen 7 comprises a capacitive panel 5 which makes it possible to make the display screen 7 touch-sensitive. The capacitive panel 5, visible in particular in FIGS. 2 and 3, is placed, for example, next to the capacitive sensor 6. The capacitive sensor 6 and the capacitive panel 5 are, for example, sandwiched between the front plate 4 and the display screen 7. In other words, this first embodiment of the interface 1 comprises a stack of distinct elements arranged in the following order: the front plate 4, the capacitive panel 5 next to the capacitive sensor 6 and finally the display screen 7 under the capacitive panel 5. This stack is more particularly visible in FIG. 3.

The capacitive panel 5 is, for example, linked to a panel controller 58, which in turn is linked to the processing unit 8. The flexible circuit board mentioned above may, for example, serve as a support for the panel controller 58. The panel controller 58 is, for example, configured to detect the fingers of a user, for example by measuring capacitive variations initiated by the contact of a finger on the capacitive panel 5. The panel controller 58 is also configured to transmit data to the processing unit 8.

According to one exemplary embodiment, the capacitive panel 5 includes a disabled area 5a configured to ignore the change in the angular position of the conductive indicators 10 during a rotational movement of the movable grip element 2a about its axis of rotation X. The disabled area 5a of the capacitive panel 5 is located at least in part below the movable grip element 2a. The disabled area 5a "masks" the influence of the conductive indicators 10 for the capacitive panel 5 and the panel controller 58. This makes it possible in particular to avoid potential errors of interpretation linked to the manipulation of the control member 2 by a user. The disabled area 5a of the capacitive panel 5 may be considered to be a "pressure dead zone".

The capacitive panel 5 is in particular linked to the display screen 7 by an optical adhesive (known as "optical bonding"). The capacitive panel 5, the optical adhesive and the front plate 4 are in particular configured to allow information displayed via the display screen 7 to be viewed. The capacitive panel 5, the optical adhesive and the front plate 4 are, for example, at least partially transparent or translucent.

An area of overlap 27 of the movable grip element 2a on the display screen 7 is for example between 20% and 50% of the projected surface area of the movable grip element 2a on the interface 1 (FIG. 4). In the embodiments presented here, the movable grip element 2a has a cylindrical shape, and the overlap area 27 is therefore in the shape of a circular segment. In FIGS. 4, 6 and 7, hatching is used to show the overlap area 27 in the form of a circular segment.

The number of conductive indicators 10 borne by the movable grip element 2a and the size of the area of overlap 27 of the movable grip element 2a on the display screen 7 are closely related. The size of the overlap area 27 is for example such that at least a portion of a conductive indicator 10 is present in the overlap area 27, and such that at least one conductive indicator 10 is present opposite the electrodes 12 of the capacitive sensor 6, independently of the angular position of the movable grip element 2a. A percentage of overlap lower than 50% of the projected surface area of the movable grip element 2a on the interface 1 may be associated with a large number of conductive indicators 10, that is to say more than two.

The overlap area 27 in the form of a circular segment is for example parametrized by an angle θ indicating the angle between two radii delimiting a circular arc of the circular segment. The angle θ is, for example, shown in FIG. 4. The angular spacing between two adjacent conductive indicators 10 is, for example, parametrized by an angle α, which is also shown in FIG. 4. In order for at least one conductive indicator 10 to appear in the overlap area 27, independently of the angular position of the movable grip element 2a, the angle θ of the circular segment of the overlap area 27 is at least equal to the angular spacing a between two adjacent conductive indicators 10.

A first embodiment of the control member 2 of the interface 1 is illustrated in FIG. 4. In this embodiment, the area of overlap 27 of the movable grip element 2a on the display screen 7 is less than 50% of the projected surface area of the movable grip element 2a on the interface 1. There are five conductive indicators 10 borne by the movable grip element 2a. As shown in FIG. 4, two of the five conductive indicators 10 are located in the overlap area 27. The angle θ of the circular segment of the overlap area 27 is greater than the angular spacing a between two adjacent conductive indicators 10. The conductive indicators 10 are, for example, arranged in a circle and are regularly spaced apart around the axis of rotation X of the movable grip element 2a. In other words, the angle α always has the same value between two adjacent conductive indicators 10.

In this first embodiment, the electrodes 12 of the capacitive sensor 6 are in the shape of a circular sector. Each circular sector, or circle sector, is, for example, of the same size. A circular sector shape for the electrodes 12 is particularly suitable in the case of a circular geometry of the movable grip element 2a. The electrodes 12 in the form of a circular sector allow homogeneous detection and are relatively easy to implement. According to a variant that is not illustrated, the electrodes 12 in the form of circular sectors have sizes that are distinct from one another.

Numerous configurations may be conceived of for the electrodes 12: various examples of conceivable embodiments for the electrodes 12 are given in FIGS. 5a, 5b and 5c. In these examples, the electrodes 12 of the capacitive sensor 6 are produced in the form of metal wires forming antennas. Each electrode 12 in the form of an antenna comprises, for example, two metal tracks 14, which are rectilinear and parallel with one another and at the end of which a head 16 is connected. FIG. 5*a* illustrates an electrode of this kind with a disk-shaped head 16. In FIGS. 5*b* and 5*c*, the heads 16 of the electrodes 12 are respectively spiral-shaped and comb-shaped. These shapes of the heads 16 make it possible to increase the capacitive surface area of the electrodes 12 while limiting the thickness of the capacitive sensor 6. In any case, regardless of the chosen shape of the electrodes 12, the latter are arranged opposite the conductive indicators 10 and configured to detect a change in the angular position of the conductive indicators 10.

According to another embodiment that is not illustrated, the interface 1 does not include a capacitive panel 5; this is then an embodiment including, for example, a display screen 7 protected by the front plate 4, but in which the interface 1 is not touch-sensitive.

According to another embodiment that is not illustrated, the movable grip element 2*a* has, for example, an annular shape. The shape of the overlap area 27 then resembles that of a portion of an annulus. The annulus portion is, for example, delimited by two radii spaced apart by an angle θ and by two circular arcs of distinct radii. The difference in the radii of the two circular arcs reflects the width of the annulus.

In a second embodiment, which is illustrated in particular in FIGS. 6 and 7, the area of overlap 27 of the movable grip element 2*a* on the display screen 7 is substantially equal to 50% of the projected surface area of the movable grip element 2*a* on the interface 1. In other words, a first half of the movable grip element 2*a* overlaps the display screen 7 and the second half of the movable grip element 2*a* overlaps the electrodes 12 of the capacitive sensor 6 that are arranged in the area 6*a* adjoining the display screen 7. Preferably, the size of the overlap area 27 then corresponds to the maximum permissible size for the overlap area 27.

In this second embodiment, the movable grip element 2*a* bears two conductive indicators 10 located at two diametrically opposite points of the movable grip element 2*a*. In other words, the two conductive indicators 10 borne by the movable grip element 2*a* are arranged on either side of the axis of rotation X. The angular spacing a between the two conductive indicators 10 is then 180°, i.e. π radians. Preferably, two is the minimum number of conductive indicators 10 that the movable grip element 2*a* is able to include in order to ensure the detection of these conductive indicators 10 by the electrodes 12 of the capacitive sensor 6.

In this second embodiment, the electrodes 12 located in the area 6*a* adjoining the display screen 7 are produced in the form of metallized pads. Electrodes 12 of this kind provide in particular a larger capacitive surface area than electrodes 12 made from metal tracks etched into or deposited on a non-conductive substrate of the capacitive sensor 6.

In this embodiment, the metallized pad of each electrode 12 is, for example, in the shape of a quadrilateral, such as a square or a rectangle. According to a variant that is not illustrated, the metallized pad of each electrode 12 may be round or else have a polygonal shape.

According to a first variant of this embodiment, the electrodes 12 of the capacitive sensor 6 are arranged in a circular arc in the area 6*a* adjoining the display screen 7. This distribution of the electrodes 12, illustrated in FIG. 6, is similar to that of the conductive indicators 10 and is able to allow effective coverage by the conductive indicators 10 over the electrodes 12 during a rotational movement of the movable grip element 2*a* about the axis of rotation X of the control member 2.

According to a second variant of this embodiment, the electrodes 12 of the capacitive sensor 6 are arranged in a line next to one another in the area 6*a* adjoining the display screen 7. Such an arrangement of the electrodes 12 in a line does not take up much space and is relatively easy to produce during the manufacture of the capacitive sensor 6. An example of an arrangement of the electrodes 12 in a line in the area 6*a* adjoining the display screen 7 is given in FIG. 7. In this example, the line of the electrodes 12 is parallel to a straight-line boundary S which delimits the area 6*a* adjoining the display screen 7.

In the case of an arrangement of the electrodes 12 in a line in the area 6*a* adjoining the display screen 7, the electrodes 12 are, for example, sized such that the conductive indicators 10 are located above an electrode 12 during a given angular sweep, regardless of the respective position of each electrode 12 relative to the axis of rotation X. Thus, the width of the electrodes 12 located at the ends of the line is, for example, less than the width of the electrodes 12 located in the middle of the line. Indeed, if, in the linearly arranged configuration, the electrodes 12 all have the same width, the arcuate path followed by the conductive indicators 10 during the rotation of the movable grip element 2*a* about the axis of rotation X means that the path segment above the electrodes 12 located at the ends is longer than that above the electrodes 12 located in the middle.

The width of the electrodes 12 is, for example, advantageously adapted so as to equalize the path segments between all the electrodes 12. This allows homogeneous detection from one electrode 12 to another. In FIG. 7, the electrodes located at the ends of the line bear the reference 12*e* and have a width smaller than that of the electrodes bearing a reference 12*m*, which are situated in the middle of the line.

As the movable grip element 2*a* is turned, the conductive indicators 10 are moved along an arcuate or circular path and sweep over an area above the electrodes 12 of the capacitive sensor 6 in the area 6*a* adjoining the display screen 7.

The electrodes 12 detect the change in capacitance linked to the movement of the conductive indicators 10 that is caused by the rotational movement of the grip element 2*a*. The detection method of the electrodes 12 involves, for example, an electrostatic field around the electrodes 12 which is disturbed by the presence of at least one conductive indicator 10 in this field. This distortion of the electrostatic field is able to be measured as a variation in capacitance. Other methods of measuring a change in capacitance are conceivable.

This variation in capacitance is then, for example, converted into a variation in voltage. The electrodes 12 generate, for example, signals which are sent to the capacitive controller 68 and to the processing unit 8 to determine the rotational position of the movable grip element 2*a*. The processing unit 8 then supplies a signal representative of an angular position of the movable grip element 2*a* relative to the fixed guide 2*b* of the control member 2.

A piece of management firmware of the control member 2 may be used to determine the angular position of the movable grip element 2*a* from the raw data generated at the electrodes 12. This management firmware is, for example, integrated in the processing unit 8. Alternatively, the management firmware of the control member 2 is, for example, integrated in the capacitive controller 68.

The invention claimed is:

1. An interface for controlling at least one function of a unit of a motor vehicle, comprising:
   at least one control member comprising a movable grip element, which is able to rotate about an axis of rotation, at least two conductive indicators, which are borne by the movable grip element and are able to move together with the latter, a guide, the movable grip element being supported and guided in rotation by the guide;

a display screen; and a capacitive sensor comprising a plurality of electrodes configured to detect a change in the angular position of the conductive indicators, the electrodes of the capacitive sensor being arranged in an area adjoining the display screen, and wherein the movable grip element is configured to partially overlap the display screen and the capacitive sensor so that the conductive indicators are movable opposite the electrodes of the capacitive sensor during a rotational movement of the movable grip element about its axis of rotation, wherein the display screen comprises a capacitive panel including a disabled area configured to ignore the change in the angular position of the conductive indicators during the rotational movement of the movable grip element about its axis of rotation.

2. The interface as claimed in claim 1, wherein an area of overlap of the movable grip element on the display screen is between 20% and 50% of the projected surface area of the movable grip element on the interface and wherein the movable grip element bears between two and ten conductive indicators.

3. The interface as claimed in claim 2, wherein the size of the overlap area is such that at least a portion of a conductive indicator is present in the overlap area, and such that at least one conductive indicator is present in the overlap area, independently of the angular position of the movable grip element.

4. The interface as claimed in claim 3, wherein the overlap area is in the shape of a circular segment and an angle indicating the angle between two radii delimiting a circular arc of the circular segment is at least equal to an angular spacing between two adjacent conductive indicators.

5. The interface as claimed in claim 2, wherein a first half of the movable grip element overlaps the display screen and wherein the second half of the movable grip element overlaps the electrodes of the capacitive sensor that are arranged in the area adjoining the display screen.

6. The interface as claimed in claim 5, wherein the movable grip element bears two conductive indicators located at two diametrically opposite points of the movable grip element.

7. The interface as claimed in claim 1, wherein the conductive indicators are arranged in a circle and are regularly spaced apart around the axis of rotation of the movable grip element.

8. The interface as claimed in claim 1, wherein the electrodes of the capacitive sensor are borne by a flexible circuit board.

9. The interface as claimed in claim 1, wherein the electrodes of the capacitive sensor are in the shape of a circular sector.

10. The interface as claimed in claim 1, wherein the electrodes of the capacitive sensor are produced in the form of metal wires forming antennas.

11. The interface as claimed in claim 1, wherein the electrodes of the capacitive sensor are produced in the form of metallized pads.

12. The interface as claimed in claim 1, wherein the electrodes of the capacitive sensor are arranged in a circular arc in the area adjoining the display screen.

13. The interface as claimed in claim 1, wherein the electrodes of the capacitive sensor are arranged in a line next to one another in the area adjoining the display screen.

14. The interface as claimed in claim 13, wherein the width of the electrodes located at the ends of the line is less than the width of the electrodes located in the middle of the line.

15. The interface as claimed in claim 1, wherein the guide of the control member is adhesively bonded to a front plate of the interface.

* * * * *